(12) United States Patent
Kim et al.

(10) Patent No.: US 10,110,394 B2
(45) Date of Patent: Oct. 23, 2018

(54) ELECTRONIC APPARATUS AND METHOD OF CONTROLLING THE SAME

(71) Applicant: SAMSUNG ELECTRONICS CO., LTD., Suwon-si (KR)

(72) Inventors: Mun-jo Kim, Suwon-si (KR); In-chul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 356 days.

(21) Appl. No.: 15/151,958

(22) Filed: May 11, 2016

(65) Prior Publication Data

US 2016/0337144 A1    Nov. 17, 2016

Related U.S. Application Data

(60) Provisional application No. 62/159,517, filed on May 11, 2015.

(30) Foreign Application Priority Data

Aug. 19, 2015    (KR) .......................... 10-2015-0116793

(51) Int. Cl.
*G06F 15/177* (2006.01)
*H04L 12/28* (2006.01)
*H04L 29/08* (2006.01)
*G05B 15/02* (2006.01)
*H04L 29/06* (2006.01)

(52) U.S. Cl.
CPC .......... *H04L 12/2816* (2013.01); *G05B 15/02* (2013.01); *H04L 67/02* (2013.01); *H04L 69/02* (2013.01); *G05B 2219/2642* (2013.01)

(58) Field of Classification Search
CPC ..................... G05B 2219/2642; G06F 15/177
See application file for complete search history.

(56) References Cited

U.S. PATENT DOCUMENTS

| 7,046,161 | B2 | 5/2006 | Hayes |
| 8,606,651 | B2 | 12/2013 | Koike et al. |
| 2013/0139089 | A1 | 5/2013 | Cho et al. |
| 2014/0244568 | A1 | 8/2014 | Goel et al. |
| 2014/0304356 | A1* | 10/2014 | Allen, Sr. .............. H04W 8/24 709/213 |

(Continued)

FOREIGN PATENT DOCUMENTS

| KR | 10-2015-0028191 A | 3/2015 |
| WO | 2006/006028 A1 | 1/2006 |

OTHER PUBLICATIONS

Hwang, et al.; "Automatic Task Generation System for IoT Home", Samsung, Best Paper Award, 2015, 2 pages total.

*Primary Examiner* — Mark Connolly
(74) *Attorney, Agent, or Firm* — Sughrue Mion, PLLC

(57) ABSTRACT

A home server of a home network system is provided. The home server includes a communication interface configured to communicate with a plurality of devices, included in the home network system, and a server of an internet network; and a controller configured to extract a conditional sentence from a webpage of the server, the conditional sentence including a condition and an action, and configured to generate a rule for controlling at least one of the plurality of devices to perform the action of the conditional sentence in response to the condition of the conditional sentence being satisfied.

20 Claims, 16 Drawing Sheets

(56) References Cited

U.S. PATENT DOCUMENTS

2015/0081798 A1 3/2015 Lee et al.
2015/0279366 A1* 10/2015 Krestnikov ............. H04W 4/70
  704/235

* cited by examiner

500

510—IFTTT

520

530— Turn on light when the door opens

540— Notes: Turn on the appliance(s) connected to the selected plug when the contact sensor reports opening

550

ELECTRONIC APPARATUS AND METHOD OF CONTROLLING THE SAME

CROSS-REFERENCE TO RELATED APPLICATIONS

This application claims priority from Korean Patent Application No. 10-2015-0116793, filed on Aug. 19, 2015, in the Korean Intellectual Property Office, and the benefit of U.S. Provisional Application No. 62/159,517, filed on May 11, 2015, in the U.S. Patent and Trademark Office, the disclosures of which are incorporated herein by reference in their entireties.

BACKGROUND

1. Field

Apparatuses and methods consistent with exemplary embodiments relate to an electronic apparatus and a method of controlling the same, and more particularly, to an electronic apparatus that automatically generates a rule of a home network system by using information that the public may access, and a method of controlling the same.

2. Description of the Related Art

Developments in electronic communication technologies have enabled various types of things to communicate with one another. Communicable things establish an Internet of Things (IoT) environment in which information is mutually shared. Things that are connected to a network may automatically perform tasks according to information acquired from other things. A home network in which things at home are connected to one another enables a user to manage a smarter lifestyle.

In order to perform operations between things supporting an IoT in an existing home network, a user may need to know about data of another device that is connected to a device supporting the IoT. Also, the user may need to know about a method of using a server that senses two different IoT devices and control operations therebetween. Thus, a method of controlling a home network system is complicated and difficult, especially for a novice user.

SUMMARY

One or more exemplary embodiments overcome the above disadvantages and other disadvantages not described above. Also, exemplary embodiments are not required to overcome the disadvantages described above, and an exemplary embodiment may not overcome any of the problems described above.

According to an aspect of an exemplary embodiment, there is provided an electronic apparatus in a home network system, the electronic apparatus including: a communication interface configured to communicate with a plurality of devices, included in the home network system, and a server of an internet network; and a controller configured to extract a conditional sentence from a webpage of the server, the conditional sentence including a condition and an action, and configured to generate a rule for controlling at least one of the plurality of devices to perform the action of the conditional sentence in response to the condition of the conditional sentence being satisfied.

The conditional sentence may be written in a natural language.

The controller may be further configured to analyze a source code of the webpage to extract the conditional sentence from the webpage.

The controller may be further configured to perform natural language processing (NLP) with respect to the extracted conditional sentence to generate computer recognizable information corresponding to the condition and the action of the conditional sentence and configured to generate the rule based on the generated computer recognizable information.

The controller may be further configured to determine at least one of a device that is a target to satisfy the condition and a device that is a target to perform the action, among the plurality of devices.

In response to a new device being added to the home network system, the controller may be further configured to search, by using the server, for a second conditional sentence related to the new device and, in response to a user command, configured to generate a second rule based on the searched second conditional sentence.

The controller may be further configured to generate a recommendation list, the recommendation list including a plurality of second conditional sentences related to the new device, based on use pattern information and configured to generate the second rule based on the second conditional sentence that is selected from the recommendation list.

The controller may be further configured to generate the use pattern information based on at least one from among a rule preregistered in the electronic apparatus, a pattern of a user in using the plurality of devices, an evaluation of the searched second conditional sentence by another user, and information about whether another device related to the searched second conditional sentence exists in the home network system.

The controller may be further configured to skip generating the rule in response to a conflict between the rule and a preregistered rule.

The preregistered rule may include a second condition and a second action that is to be performed in response to the second condition being satisfied, and the conflict between the rule and the preregistered rule may include at least one of: a conflict between the condition of the conditional sentence and a third condition that is achieved after performing the action of the conditional sentence; a conflict between the third condition and a fourth condition that is achieved after performing the second action of the preregistered rule; in a case where the fourth condition is equal to the condition of the conditional sentence, a conflict between the fourth condition and the second condition of the preregistered rule; and in a case where the preregistered rule includes two or more second actions to be performed in response to the second condition being satisfied, and a fifth condition that is achieved after performing one of the two or more second actions of the preregistered rule is equal to the condition of the conditional sentence, a conflict between the third condition and a sixth condition that is achieved after performing another one of the two or more second actions of the preregistered rule.

According to an aspect of another exemplary embodiment, there is provided a method of controlling an electronic apparatus in a home network system, the home network system including a plurality of devices, the method including: extracting, by the electronic apparatus, a conditional sentence from a webpage of a server through an internet network, the conditional sentence including a condition and an action; and generating, by the electronic apparatus, a rule for controlling at least one of the plurality of devices to perform the action of the conditional sentence in response to the condition of the conditional sentence being satisfied.

The conditional sentence may be written in a natural language.

A source code of the webpage may be analyzed to extract the conditional sentence from the webpage.

The generating may include performing NLP with respect to the extracted conditional sentence to generate computer recognizable information corresponding to the condition and the action of the conditional sentence; and generating the rule based on the generated computer recognizable information.

The method may further include determining at least one of a device that is a target to satisfy the condition and a device that is a target to perform the action, among the plurality of devices.

The generating may include, in response to a new device being added to the home network system, searching, by using the server, for a second conditional sentence related to the new device; and in response to a user command, generating a second rule based on the searched second conditional sentence.

The generating the second rule may include generating a recommendation list, the recommendation list including a plurality of second conditional sentences related to the new device, based on use pattern information; and generating the second rule based on the second conditional sentence that is selected from the recommendation list.

The use pattern information may be generated based on at least one from among a rule preregistered in the electronic apparatus, a pattern of a user in using the plurality of devices, an evaluation of the searched second conditional sentence by another user, and information about whether another device related to the searched second conditional sentence exists in the home network system.

The generating the rule may be skipped in response to a conflict between the rule and a preregistered rule.

The preregistered rule may include a second condition and a second action that is to be performed in response to the second condition being satisfied, and the conflict between the rule and the preregistered rule may include at least one of: a conflict between the condition of the conditional sentence and a third condition that is achieved after performing the action of the conditional sentence; a conflict between the third condition and a fourth condition that is achieved after performing the second action of the preregistered rule; in a case where the fourth condition is equal to the condition of the conditional sentence, a conflict between the fourth condition and the second condition of the preregistered rule; and in a case where the preregistered rule includes two or more second actions to be performed in response to the second condition being satisfied, and a fifth condition that is achieved after performing one of the two or more second actions of the preregistered rule is equal to the condition of the conditional sentence, a conflict between the third condition and a sixth condition that is achieved after performing another one of the two or more second actions of the preregistered rule.

According to an aspect of still another exemplary embodiment, there is provided an electronic apparatus communicatively coupled to a home network, the electronic apparatus including: a sensor configured to monitor a status of the home network; a user rule database (DB) configured to store a rule according to the monitored status of the home network; and a rule manager, implemented by at least one processor, configured to activate the stored rule to apply the rule to the home network, wherein, in response to a new device being added to the home network, the rule manager is further configured to generate a second rule according to the new device by extracting information from a webpage through an internet network, the extracted information including a conditional sentence related to the new device, and configured to store the second rule in the user rule DB.

The conditional sentence may include a condition and an action, and the electronic apparatus may be configured to control the action to be performed in response to the condition being satisfied when the second rule is activated by the rule manager.

The electronic apparatus may further include a crawling engine configured to crawl the webpage.

BRIEF DESCRIPTION OF THE DRAWING FIGURES

The above and/or other aspects will be more apparent by describing certain example embodiments with reference to the accompanying drawings in which.

DETAILED DESCRIPTION

Figure 1:
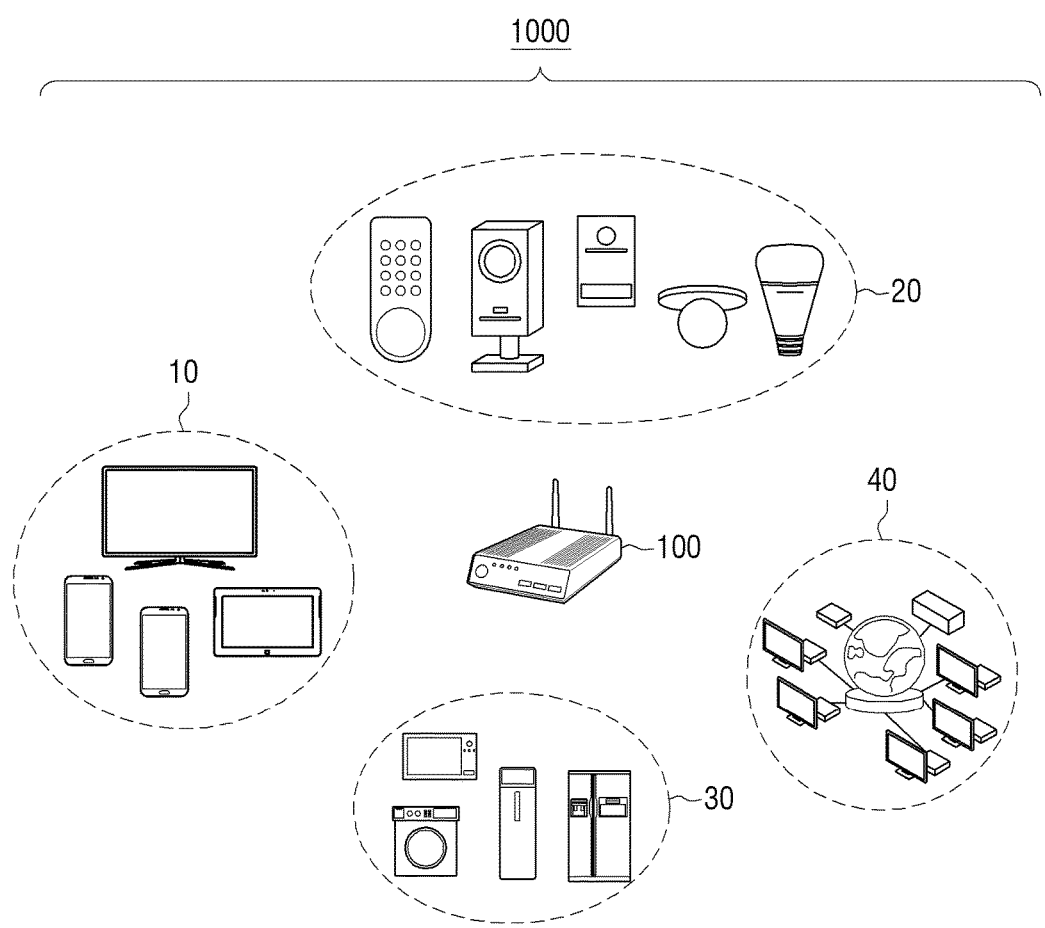
FIG. 1 illustrates a configuration of a home network system according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

The terms "first", "second", etc. may be used to describe diverse components, but the components are not limited by the terms. The terms are only used to distinguish one component from the others.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in detail with reference to the accompanying drawings.

FIG. 1 illustrates a configuration of a home network system 1000 according to an exemplary embodiment.

Referring to FIG. 1, the home network system 1000 includes a user terminal device 10, a sensing device 20, a target device 30, an internet network 40, and a home server 100.

The user terminal device 10 provides a user interface (UI) for configuring the home network system 1000 by a user. The user terminal device 10 also provides the user with status information, operation information, a registered rule, etc. of the home network system 1000.

The user terminal device 100 may be a television (TV), a cellular phone, a tablet personal computer (PC), a laptop PC, or the like having a display capable of visually displaying information.

The sensing device 20 includes various types of electronic devices that may sense statuses of a home. The sensing device 20 may be a single-purpose sensor that senses a status. Alternatively, the sensing device 20 may be a device that senses a status to perform an operation.

The sensing device 20 may include, for example, a digital door lock that may sense opening and closing of a door, an energy storage system (ESS) that may sense a power interruption, a door cam that may sense a presence of a person outside the door, a sensor light that may sense an approach of a person, an alarm that may monitor a trespass of a stranger, or the like.

The target device 30 is a device that is a target to be controlled to perform a particular operation based on information crawled (or extracted) through a home network. For example, the target device 30 may include a white home appliance that may be connected to the home network and may be controlled through communications. In detail, the target device 30 may include a TV, a refrigerator, a washer, an air conditioner, an oven, a dishwasher, a robot cleaner, or the like.

The internet network 40 may include a broadband communication network that connects worldwide networks. The internet network 40 is connected to various types of external devices. The internet network 40 may provide the user with connections to external servers that provide various types of services. The internet network 40 may provide an access to a commercial service providing server accessible and used by ordinary people. Examples of a server that may be accessed through the internet network 40 may include a server, a portal server, a community server, a social networking services (SNS) server, etc. provided by an IoT device manufacturer.

The home server 100 establishes a home network. In detail, an electronic apparatus connect the user terminal device 10, the sensing device 20, and the target device 30 to one another may be realized as a home server 100. The home server 100 may monitor and manage the user terminal device 10, the sensing device 20, and the target device 30. The home server 100 may be connected to the internet network 40 to provide an access to the home network from an external terminal.

The home server 100 may control to perform a functionality of the target device 30 according to status information that is acquired from the sensing device 20 based on a rule.

The home server 100 may acquire information for generating a rule from the internet network 40.

In an exemplary embodiment, the home server 100 is realized as a physical server device installed in the home.

In another exemplary embodiment, the home server 100 may be a clouding server. In detail, the user terminal device 10, the sensing device 20, and the target device 30 are individually connected to the internet network 40. An external server that provides a home network service through the internet network 40 may be used as the personal home server 100. In this case, to establish the home network, the home network system 1000 may include a home hub (not shown) that is connected to the user terminal device 10, the sensing device 20, the target device 30, and the internet network 40.

The home network system 1000 as described above may perform an operation of a target device according to a command input from a personal terminal and a status sensed from the sensing device 20 or the like in a home. Also, a home server that is connected to the internet network 40 may generate a rule from information that is open.

Figure 2:
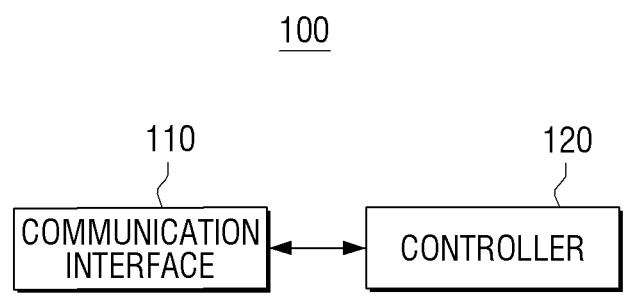
FIG. 2 is a block diagram of a configuration of a home server according to an exemplary embodiment.

FIG. 2 is a block diagram of a configuration of a home server 100 according to an exemplary embodiment.

Referring to FIG. 2, the home server 100 includes a communication interface 110 and a controller 120.

The communication interface 110 performs communications. In detail, the communication interface 110 may communicate with a plurality of devices 10, 20, and 30 included in the home network system 1000 and a server of the internet network 40.

The communication interface 110 may include a network controller that complies with various types of communication methods such as a WiFi chip, a Bluetooth chip, a near field communication (NFC) chip, a wireless communication chip, etc. The communication interface 110 may include a port that may connect the home server 100 to serial and/or parallel wire cables.

The controller 120 controls elements of the home server 100. In detail, the controller 120 may control elements that perform functionalities for monitoring and controlling devices constituting the home network system 1000 according to a rule of the home server 100.

The controller 120 crawls (or extracts) a conditional sentence from the server of the internet network 40. In detail, the controller 120 may crawl a conditional sentence posted on a webpage of the server.

The conditional sentence refers to a sentence including a conditional clause and a result clause. The conditional sentence may be divided into an "if-clause" indicating a condition and a "then-clause" indicating a result. In an exemplary embodiment, the conditional sentence may be represented by "If This, Then That" (IFTTT). Accordingly, the conditional sentence may be called as the IFTTT sentence. The "if-clause" of the conditional sentence corresponds to a condition of a rule, and the result clause of the conditional sentence corresponds to an action of the rule. In addition to a conditional sentence including "if" and "then," a sentence written in a subjunctive mood in grammar may be included in a conditional sentence. For example, the conditional sentence may include a form including "imperative sentence+when clause" and a form of "imperative sentence+ with means". As described above, the conditional sentence may be a sentence that is written in a natural language that is recognizable by a person.

A conditional sentence that may be written by a user or a developer is posted on a server that may be accessed by the home server 100 through the internet network 40. For example, if the server is registered in a home network system, the server may provide a site on which users may freely post useful rules. Also, the users may access the server to freely write a conditional sentence through a web document writer or the like provided on the site.

The home server 100 may pre-store an address of a website on which developers and/or users may freely write a rule as a conditional sentence. The controller 120 may access at least one pre-stored address to crawl a conditional sentence.

The controller 120 may extract a conditional sentence from several pieces of information constituting a webpage. In detail, the controller 120 may analyze a source code of the webpage to extract the conditional sentence from the webpage. The source code of the webpage is written in a programming language such as a Hypertext Mark-up Language (HTML). The controller 120 may identify a part of the source code of the webpage, in which a letter string corresponding to the conditional sentence is written, and extract the conditional sentence from the identified part. For example, if it is determined that the source code of the webpage is written in the HTML, tag <span> belonging to a rank lower than tag <body> may be attached, and a letter string to which itemprop="name" indicating a letter attribute of a text is applied may be extracted as a conditional sentence.

The controller 120 generates a rule. In detail, the controller 120 may generate a rule corresponding to a crawled conditional sentence.

In more detail, the controller 120 may perform natural language processing (NLP) with respect to the crawled conditional sentence to generate a context for processing a condition as computer-recognizable information and generate a functionality of processing an operation as computer-recognizable information and may generate a rule by using the generated context and functionality.

The NLP refers to processing for converting a person-recognizable natural language into computer-determinable information. The controller 120 may include a module that divides a sentence written in a natural language into morphemes, parts of speech, phrases, clauses and analyzes a meaning of the sentence according to the sentence analysis.

The context indicates a situation of a home network or information of an incident or a situation and corresponds to a status of a device or a change in the status of the device. The context may be information which expresses the status in a structural machine language. For example, "Door is opened" may be converted into a structural machine language "door.open".

The functionality indicates an automated service, ability, or drive of the home network and corresponds to an operation of a device. The functionality may be information that expresses an operation in a structural machine language. For example, "Turn on light." may be converted into a structural machine language "light.on".

The conditional sentence may not designate a particular device. For example, when an indoor temperature is lowered by a certain Celsius degree or more, a conditional sentence thereof may not designate or include a sensor for sensing the indoor temperature and an air conditioner capable of lowering the indoor temperature.

The controller 120 may pre-store information for identifying a plurality of devices configuring a home network. In detail, the controller 120 may store information for identifying a plurality of devices connected to the home server 100. The stored identification information may be referred to as things. The things may include various types of information such as a manufacturer, a name, and a function of a device, a status of the device after performing an operation, etc.

Also, the controller 120 may determine a device that is a target of a condition and a device that is a target of an action, by using identification information (i.e., things). In the above exemplary embodiment, the controller 120 may determine a device having a functionality of sensing an indoor temperature by using a functionality item of a thing. The controller 120 may also determine a device having a cooling functionality for lowering a temperature.

The controller 120 may sense an addition of a new device to the home network. The controller 120 may also search for a conditional sentence for a new device added to a server. If a user command is received, the controller 120 may generate a rule according to the searched conditional sentence. An exemplary embodiment for generating a rule of a new device will be described in more detailed later with reference to FIGS. 7 through 9.

The controller 120 may generate use pattern information. In detail, the controller 120 may monitor a plurality of devices of the home network. The controller 120 may also check a habit of a user, a regular daily schedule of the user, a habit of the user who uses a device, or the like based on monitored information, i.e., a result of monitoring the plurality of devices. Also, the controller 120 may generate use pattern information from accumulated history information. For example, the controller 120 may generate a pattern of ringing an alarm at a regular wake-up time of the user and turning on light in a room, a habit of turning off indoor power and closing windows before opening the door and going to work, and a particular broadcast program preferred by the user at a fixed time when turning on a TV after getting off work, as use pattern information.

In this example, if an IoT product is installed in the home afterwards, the home server 100 may automatically turn on the light in the room at the wake-up time, automatically turn off the indoor power and close the window when the user goes to work, and recommend the user a rule for changing a channel to the particular program at the fixed time and generate the rule when the user turns on the TV, based on the use pattern information.

The controller 120 may also generate use pattern information from rules that are pre-registered and used. For example, rules used by the user include a rule for turning on light in a bedroom and turning on power of a coffeepot in a kitchen to make coffee if the wake-up time arrives. The controller 120 may generate use pattern information, which indicates that the user wakes up, moves to the kitchen, and drinks tea, from the pre-registered rules.

In this example, if an IoT light is installed in the kitchen afterwards, the home server 100 may recommend the user a rule for turning on the light in the kitchen at the wake-up time and generate the rule, based on the above use pattern information.

The controller 120 may generate use pattern information based on a use by a third person (or another user). In detail, the controller 120 may crawl a conditional sentence and evaluation information by the third person with respect to the conditional sentence from the server. The evaluation information by the third person include a numerical value or a grade of usefulness, preference, etc. of a posted conditional sentence, which is evaluated by the third person who is not an author, or the number of people that use the posted conditional sentence. The controller 120 may generate use pattern information indicating that an evaluation of a conditional sentence performed by the third person is high.

The controller 120 may generate a recommendation list. In detail, the controller 120 may generate a recommendation list that provides the user with a rule corresponding to one conditional sentence or a plurality of conditional sentences. The controller 120 may generate the recommendation list based on the use pattern information. Therefore, the home server 100 may recommend the user a rule appropriate and useful for a lifestyle of the user.

As described above, use pattern information for providing a recommendation list to a user is not limited to the above-described examples. The use pattern information may be information that is a criterion for selecting a user-customized rule among many conditional sentences.

The controller 120 may determine whether a newly added rule is inappropriate. In detail, the controller 120 may determine whether a newly registered rule overlaps a pre-registered rule, has a contradictory logic to the preregistered rule, or is incompatible with the preregistered rule. This will be described in more detail later with reference to FIGS. 10 through 16.

The controller 120 may include a central processing unit (CPU), a read only memory (ROM) that stores a control program, and a random access memory (RAM) that stores a signal or data input from an external source or is used as a memory area for a performed task. The CPU may include at least one selected from a single core processor, a dual core processor, a triple core processor, and a quad core processor. The CPU, the ROM, and the RAM may be connected to one another through an internal bus.

The home server 100 as described above may generate a programmed rule that adheres to compatibilities between home network systems that are respectively different according to manufacturers and a rule from a conditional sentence that is open to the public.

Figure 3:
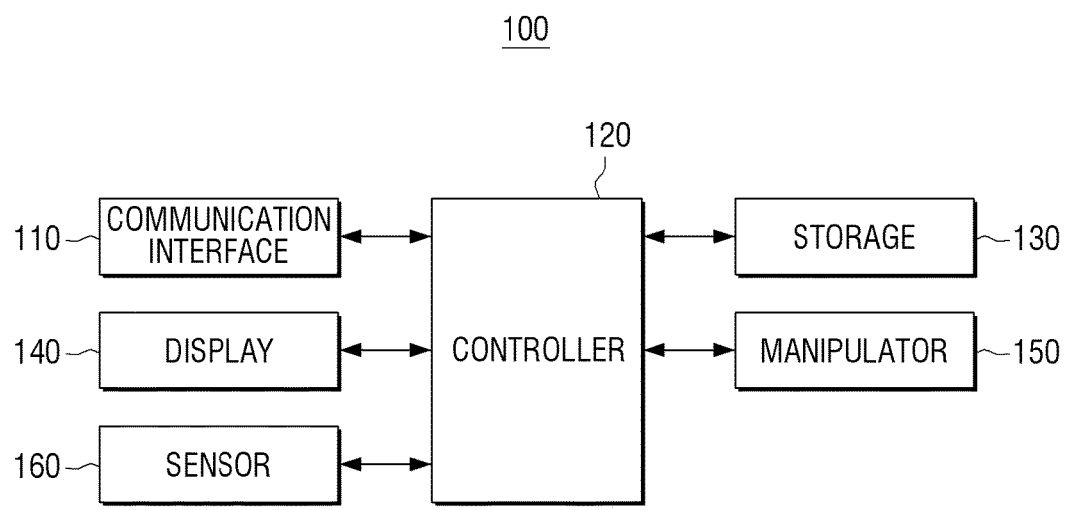
FIG. 3 is a block diagram of a detailed configuration of the home server of FIG. 2.

FIG. 3 is a block diagram of a detailed configuration of the home server 100 of FIG. 2.

Referring to FIG. 3, the home server 100 includes a communication interface 110, a controller 120, a storage (or storage device) 130, a display 140, a manipulator 150, and a sensor 160.

The communication interface 110 performs communications. Detailed structure and function of the communication interface 110 are the same as or similar to those of the communication interface 110 of FIG. 1, and thus detailed descriptions thereof are omitted.

The storage 130 stores data and programs for performing an operation and a functionality of the home server 100. For example, the storage 130 may store a crawled conditional sentence, history information about a monitored device, generated use pattern information, at least one rule registered in a home network, a modularized program for processing a natural language, a program for providing an interface recommending a rule to a user, etc.

For example, information that is extracted from a source code of a webpage of FIG. 5 may be arranged as follows and stored in the storage 130.

TABLE 1

| Field | data |
| --- | --- |
| Title | Turn on a light when the door opens |
| Note | Turn on the appliance(s) connected to the selected plug when the contact sensor reports opening |
| Number of Favorite | 17 |
| Receipt Data | 2014 Aug. 29 |
| URL | https://ifttt.com/recipes/211739-turn-on-a-light-when-the-door-opens |
| Etc. | . . . |

The storage 130 may include a context knowledge base (KB), a functionality KB, a things KB, and a rule database (DB).

The context KB may be a DB accumulating a table arranging a status corresponding to a condition as follows.

TABLE 2

| Field | data |
| --- | --- |
| Context Category | Things_status |
| Target | Door |
| Value | Opened |
| Description | Door Opened |
| Etc. | . . . |

The functionality KB may be a DB accumulating a table arranging an action, and a pre-condition and a post-condition for the action as follows.

TABLE 3

| Function | data |
| --- | --- |
| Name | Turn on |
| Pre-condition | Turn_off |
| Post_condition | Turned_on |
| Effect | Brighten |
| Etc. | . . . |

The things KB may be a DB accumulating a table arranging functionalities and identification information of devices configuring a home network as follows.

TABLE 4

| Field | data |
| --- | --- |
| Things Category | Light |
| Name | Hue ™ |
| Functionality | turn.on/turn.off/dim/color_change |
| Description | Light form Phillips ™ |
| Etc. | . . . |

The rule DB may be a DB accumulating a table arranging a name given to a rule, and a condition and an action configuring the rule as follows.

TABLE 5

| Rule | data |
|---|---|
| ID | Ruleid_001 |
| Condition | Door.Opened |
| Tasks | Light.turn_on |

The storage 130 may be realized as a storage medium of the home server 100 or an external storage medium, e.g., a removable disk including a universal serial bus (USB) memory, a web server through a network, or the like. An RAM and an ROM that are used for storing and performing a program have been described as elements of the controller 120 herein but may be realized as elements of the storage 130.

The storage 130 may include an ROM, an RAM, or a memory card (e.g., a secure digital (SD) card, a memory stick, or the like) that may be removed from and/or installed in the home server 100. The storage 130 may also include a nonvolatile memory, a volatile memory, a hard disk drive (HDD), or a solid state drive (SSD).

In an exemplary embodiment, the storage 130 has been described as an element that is combined with or installed in the home server 100 but is not limited thereto. The storage 130 may be a personal storage that may perform communications through the communication interface 110, and store and back up a large capacity file in a remote place or may be a server that provides a file hosting service (referred to as a web hard service).

The display 140 displays a screen. For example, the display 140 may display a screen for providing an interface to the user. The display 140 may display an interface screen for newly generating a rule, editing stored rules, deleting the stored rules, and activating and/or inactivating the stored rules. The display 140 may display a screen that recommends a new rule associated with a newly installed device. The recommendation screen may include a recommendation list that lists at least one new conditional sentence.

In an exemplary embodiment, the display 140 is an element that is included in the home server 100 to display a screen. In another exemplary embodiment, an operation and a functionality of the display 140 may be realized through a display device that may remotely communicate with the home server 100.

The display 140 may be realized as at least one from among a liquid crystal display (LCD), a thin film transistor (TFT)-LCD, an organic light-emitting diode (OLED), a flexible display, and a three-dimensional (3D) display.

The manipulator 150 receives a manipulation of the user. In detail, the manipulator 150 may receive a user manipulation for inputting a command. The user manipulation may be an input that interacts through the interface screen displayed on the display 140. The manipulator 150 may be realized as a physical button or a touch panel that senses a touch of a surface. Also, while the manipulator 150 is described as an element that is separate from the display 140 in the exemplary embodiment of FIG. 3, the manipulator 150 may be combined with the display 140 and realized as one touch display panel.

In an exemplary embodiment, the manipulator 150 is an element that is included in the home server 100 but is not limited thereto. In another exemplary embodiment, an operation and a functionality of the manipulator 150 may be realized as an input unit that may remotely communicate with the home server 100 through the communication interface 110.

The sensor 160 may include at least one sensor for sensing a status or a situation of the home network or an action of the user. The sensor 160 may include at least one from among a geomagnetic and/or acceleration sensor, a temperature sensor, a pressure sensor, a proximity sensor, an illuminance sensor, a position sensor, a gas sensor, a camera, and a microphone.

In an exemplary embodiment, the sensor 160 is an element that is included in the home server 100 but is not limited thereto. In another exemplary embodiment, the operation and functionality of the sensor 160 may be realized as the sensing device 20 that communicates with the home server 100 through the communication interface 110.

The controller 120 controls elements of the home server 100. Descriptions of a structure and a functionality of the controller 120 are the same as or similar to those of the controller 120 of FIG. 2 and thus are omitted.

The controller 120 may display a webpage on the display 140 according to an input of the user who browses an internet network. The controller 120 may add a conditional sentence of a webpage searched by the user as a rule according to a received user command.

The controller 120 may display an interface screen for newly generating a rule, editing stored rules, deleting the stored rules, and activating and/or inactivating the stored rules. The controller 120 may also newly register, edit, delete, and activate and/or inactivate a rule according to a received user command.

The controller 120 may receive information sensed by the sensor 160 to generate use pattern information. The controller 120 may also determine whether a home network is in a status corresponding to a condition of a registered rule, based on the sensed information.

The home server 100 as described above may generate a rule from a conditional sentence that is open to the public instead of generating a programmed rule that adheres to compatibilities of home network systems that are respectively different according to manufacturers.

Figure 4:
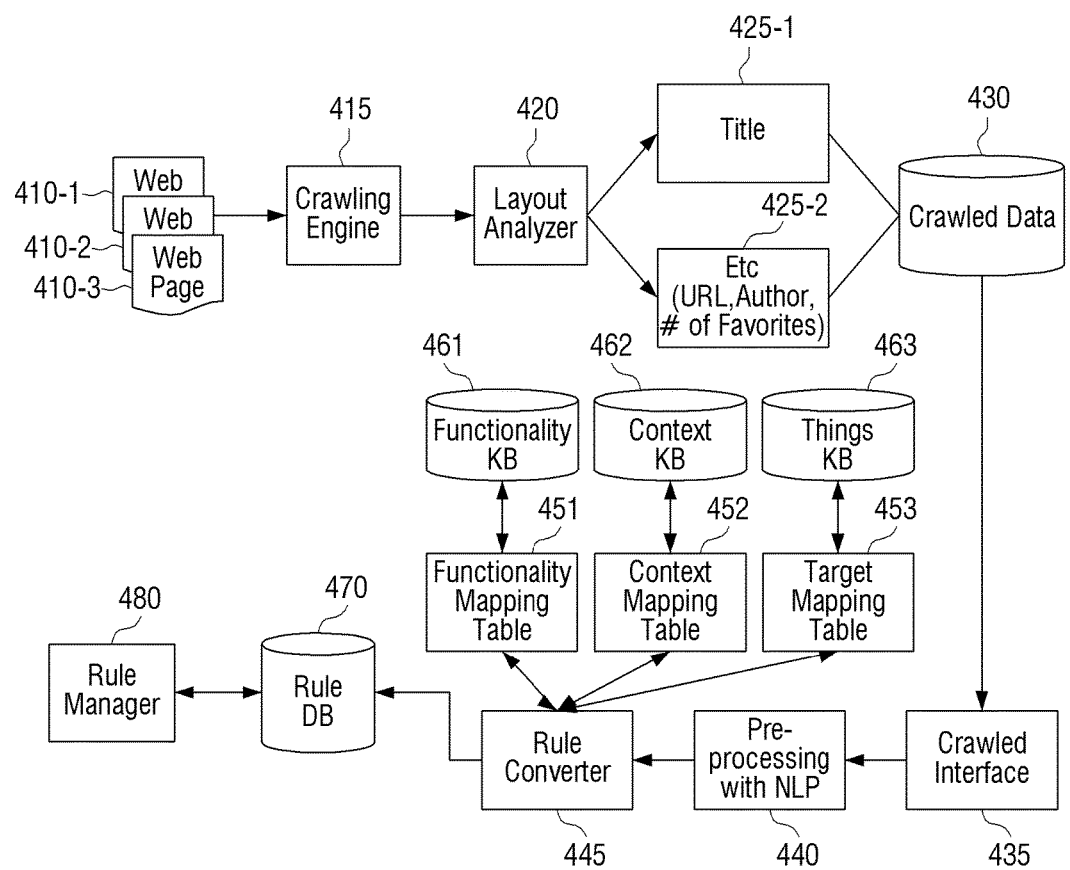
FIG. 4 illustrates a process of generating a rule through a home server, according to an exemplary embodiment.

FIG. 4 illustrates a process of generating a rule through a home server, according to an exemplary embodiment.

Referring to FIG. 4, a plurality of webpages 410-1, 410-2, and 410-3 on which a conditional sentence is posted exist on an internet network. A crawling engine 415 crawls the webpages 410-1, 410-2, and 410-3 including the conditional sentence.

A layout analyzer 420 analyzes layouts constituting the webpages 410-1, 410-2, and 410-3 from source codes of the crawled webpages 410-1, 410-2, and 410-3 and determines parts in which the conditional sentences are written and parts including other information according to the analyzed results.

The layout analyzer 420 extracts a title 425-1 and other information 425-2 representing a conditional sentence from the webpages 410-1, 410-2, and 410-3. The other information 425-2 may also include a uniform resource locator (URL) and an author of a webpage, the number of favorite people, etc.

A crawled data storage 430 stores the title 425-1 and the other information 425-2 extracted by the layout analyzer 420.

If a command of a user for generating a rule is received or a particular event for generating a rule occurs, a crawled interface 435 reads a conditional sentence, which corresponds to the command of the user or the event, and information about the conditional sentence from the crawled data storage 430 and transmits the conditional sentence and the information to a preprocessor 440.

The preprocessor 440 performs pre-processing for converting a conditional sentence into a rule. The preprocessor 440 performs natural language processing (NLP) to analyze crawled information, which is written in a natural language, in a computer-recognizable language.

A rule converter 445 performs a task for converting contents of a conditional sentence into an element supported in the home server 100. Since the rule converter 445 performs a task for converting crawled data to use the crawled data in the home server 100, a migration may be regarded as being performed.

The rule converter 445 performs the converting with reference to a functionality mapping table 451, a context mapping table 452, and a target mapping table 453. For example, if a result processed in a natural language from a conditional sentence enables and/or disables a functionality of a device, the rule converter 445 converts the result into an element "turn_on" and/or an element "turn_off" that may be processed by the home server 100, with reference to the functionality mapping table 451.

The conditional sentence on which the pre-processing and the converting are performed may be divided into a status corresponding to a condition, an action, and a device that is a target of the conditional sentence.

The context mapping table 452 is used to determine whether the status corresponding to the condition is included in a context KB 462 storing a status monitored in the home server 100.

The functionality mapping table 451 is used to determine whether the action is included in a functionality KB 461 storing functionalities performable by devices of a home network.

The target mapping table 453 is used to determine whether a device that is a target of a conditional sentence is included in a things KB 463 storing identification information of devices of the home network.

If mapping between the conditional sentence and a corresponding KB is identified by using the functionality mapping table 451, the context mapping table 452, and the target mapping table 453, a context, a functionality, and a rule that may be recognized and processed by the home server 100 may be generated based on the mapping.

The generated rule is stored in a rule DB 470. A rule manager 480 activates the stored rule to apply the rule to a home network system.

Figure 5:
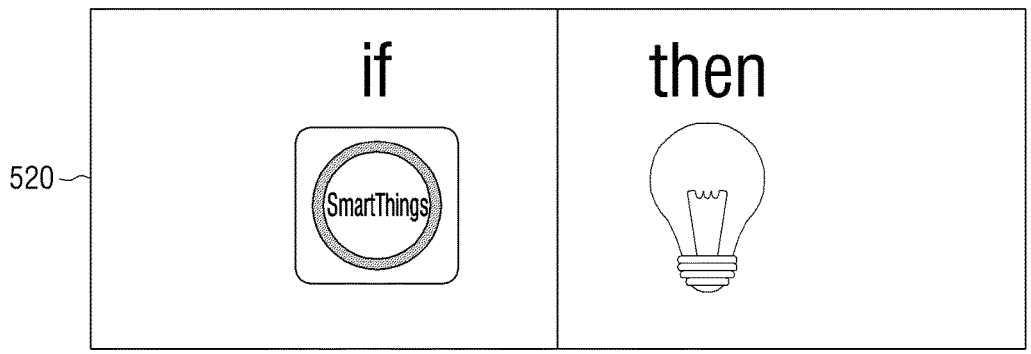
FIG. 5 illustrates a user interface (UI) of open data according to an exemplary embodiment.
Figure 5:

FIG. 5 illustrates a user interface (UI) based on open data according to an exemplary embodiment.

Referring to FIG. 5, a webpage that is open to the public is written in an HTML and uploaded to a server that operates in an IFTTT 510. FIG. 5 illustrates a graphic UI 500 through which a web browser visually renders and displays a source code written in an HTML.

The webpage includes a first area 520 that expresses a conditional sentence by using an icon. A picture crawled from the first area 520 may be used as an icon through which a user may easily recognize the rule when storing the rule in a rule DB.

A conditional sentence 530 may be expressed in a title style. Shapes of letters that are arranged and emphasized in a center portion of the graphic UI 500 may be a criterion for identifying that the letters correspond to the conditional sentence 530.

Notes 540 may operate to describe the conditional sentence 530 in more detail and may indicate an intention or a purpose of an author. The notes 540 may be crawled as other information 425-2 and stored in the rule DB as a description of the rule.

An add button 550 is an area with which the user may interact. The user clicks the add button 550 to directly add a rule that is based on the conditional sentence 530.

Figure 6:
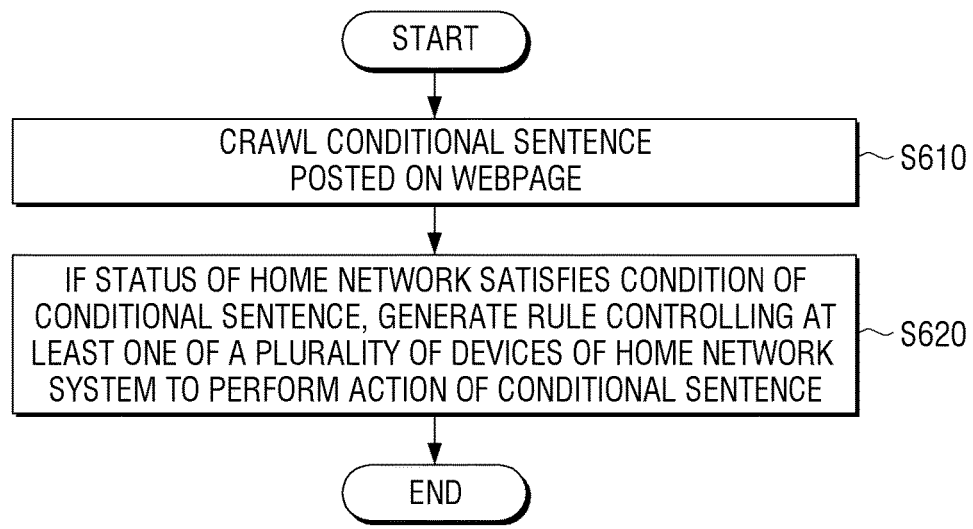
FIG. 6 is a flowchart of a method of controlling a home server according to an exemplary embodiment.

FIG. 6 is a flowchart of a method of controlling a home server according to an exemplary embodiment.

Referring to FIG. 6, the home server crawls a conditional sentence posted on a webpage in operation S610. In detail, the home server may crawl a conditional sentence posted on a webpage of the home server through an internet network.

The conditional sentence may be written in a natural language. In this case, the home server may perform NLP to generate a context and a functionality that may be recognized by a computer.

The home server may analyze a source code of the webpage and extract a desired conditional sentence from the source code.

In operation S620, the home server generates a rule according to the conditional sentence. In detail, if a status of a home network satisfies a condition of the conditional sentence, the home server generates a rule for controlling at least one of a plurality of devices of a home network system to perform an action of the conditional sentence.

The rule may include the generated context and functionality. Also, the home server determines a device that is a target of the condition and a device that is a target of the action. In detail, to apply the rule, the home server may determine a device that is to perform monitoring to check a status and determine a device that is to be controlled to perform the action.

The method of controlling the home server as described above may automatically generate a rule, which is to be applied to a home network, from open data.

Figure 7:
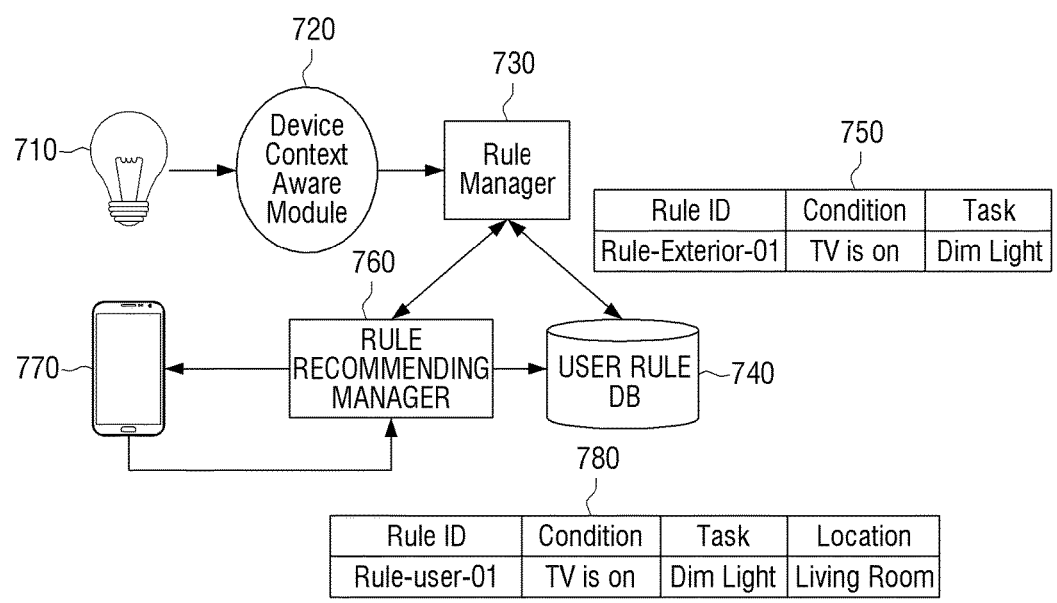
FIG. 7 illustrates a process of recommending a rule through a home server, according to an exemplary embodiment.

FIG. 7 illustrates a process of recommending a rule through a home server according to an exemplary embodiment.

Referring to FIG. 7, a new light 710 that supports an IoT functionality is installed in a home network system. A device context aware module 720 senses an addition of the light 710. The device context aware module 720 also acquires subsidiary information such as a type and an installation location of the light 710.

A rule manager 730 is informed of an addition of a new device and searches whether a rule targeting the light 710 is stored in a user rule DB 740. Here, if a rule targeting the light 710 is pre-stored in the user rule DB 740, i.e., a rule that is applied to the light 710 of the home network system, the rule manager 730 ends a recommendation process and immediately applies the rule with respect to the light 710.

If the rule of the light 710 does not exist in the user rule DB 740, the rule manager 730 searches for the rule of the light 710. In an exemplary embodiment, if a TV in a living room is turned on, a rule 750 that dims a light may be found as a result of searching.

The device context aware module 720 may inform the crawling engine 415 of the addition of the new device and information about the new device. In this case, the crawling engine 415 crawls a conditional sentence targeting the light 710 from a webpage 410 posted on a server. Hereinafter, a new rule corresponding to a conditional sentence crawled according to the process of FIG. 4 is stored in the rule DB 470. The rule managers 480 and 730 may search the rule DB 470, to which a new rule is added, for the rule of the light 710.

The rule manager 730 transmits the rule 750 to a rule recommending manager 760. The rule recommending manager 760 recommends the rule 750 to a user. According to an exemplary embodiment, the rule recommending manager 760 may transmit a recommendation list that includes a plurality of rules searched from preregistered user information through a mobile phone 770 of the user. A device for recommending a rule is not limited to the mobile phone 770, and various types of devices included in the user terminal device 10 may be used.

If a response for permitting the rule 750 is received from the mobile phone 770, the rule recommending manager 760 stores the rule 750 in the user rule DB 740. If a response for selecting some of the plurality of rules included in the recommendation list is received, the rule recommending manager 760 stores selected rules in the user rule DB 740. As shown in FIG. 7, a new identification (ID) may be allocated to the stored new rule 750, and location information may be further added to the stored new rule 750.

Figure 8:
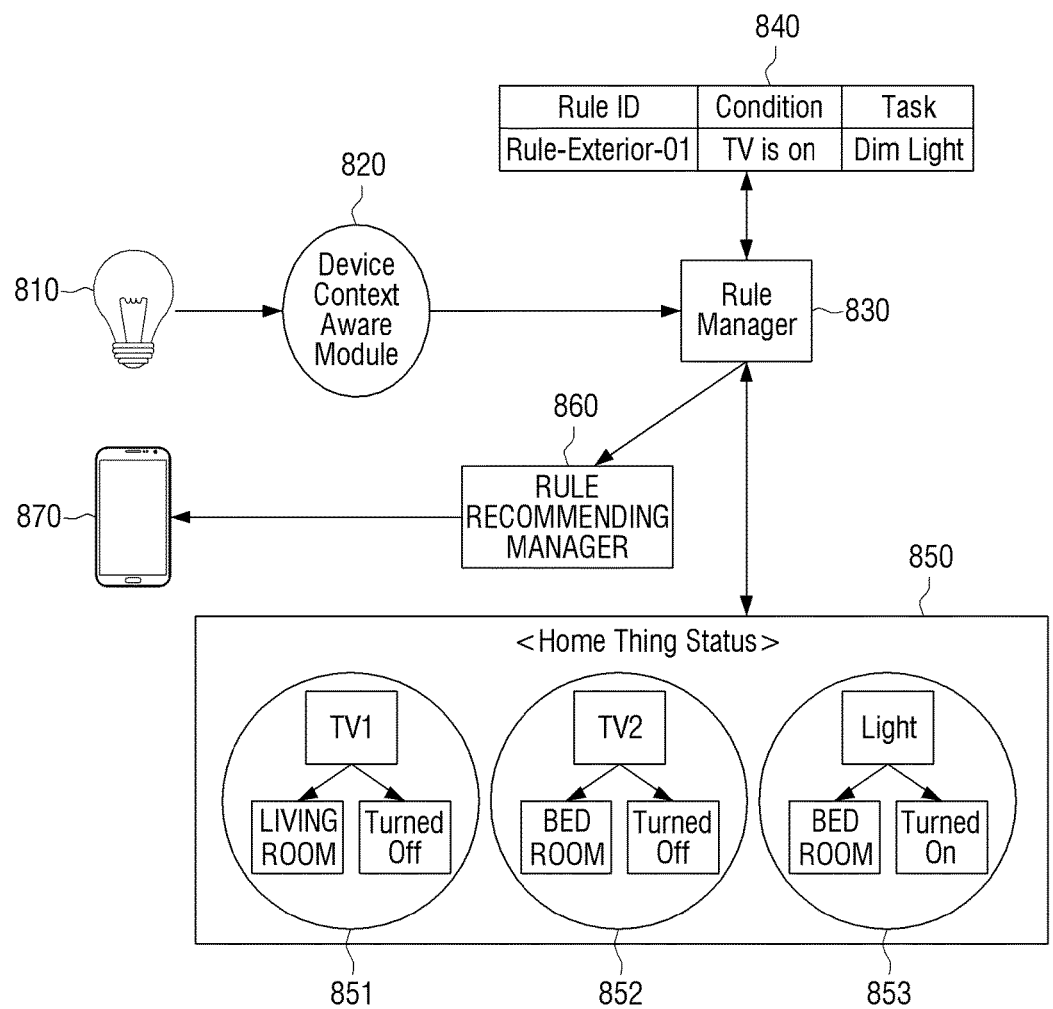
FIG. 8 illustrates a process of recommending a rule through a home server, according to another exemplary embodiment.

FIG. 8 illustrates a process of recommending a rule through a home server, according to another exemplary embodiment.

A device context aware module 820 senses an addition of a light 810. The device context aware module 820 informs a rule manager 830 of the addition of the light 810 and information about the light 810.

The rule manger 830 searches the rule DB 470 for a rule of the light 810. In this case, the rule manager 830 selects the rule of the light 810 as a rule appropriate for a situation of a home network to search for the rule.

The rule manager 830 refers to a home thing status 850 including a type of a device configuring the home network, a location of the device, and real-time monitored status information of the device. In the exemplary embodiment of FIG. 8, the home thing status 850 includes a first status 851 where TV1 is located in a living room and is turned off, a second status 852 where TV2 is located in a bedroom and turned off, and a third status 853 where a light is located in the bedroom and turned on.

The rule manager 830 selects a rule 840, which if a TV is turned on, dims a light, based on a situation where a new device is the light 810 and installed in the living room and based on the status 851 where the TV1 is currently located in the living room.

According to another exemplary embodiment, the rule manager 830 refers to use pattern information. For example, a user has a history of lowing a luminance of a light when watching a TV. If the TV in the living room is turned on, the rule manager 830 may select the rule 840 that dims the light if the TV is turned on.

The rule manager 830 transmits the searched rule 840 to a rule recommending manager 860. The rule recommending manager 860 transmits the rule 840 to a mobile phone 870 of the user that is preregistered.

The user is recommended the new rule 840 through the mobile phone 870, inputs a command for permitting or rejecting an addition of a recommended rule, and stores the rule 840 in the user rule DB 740 according to an input of the command for permitting the addition of the recommended rule.

Figure 9:
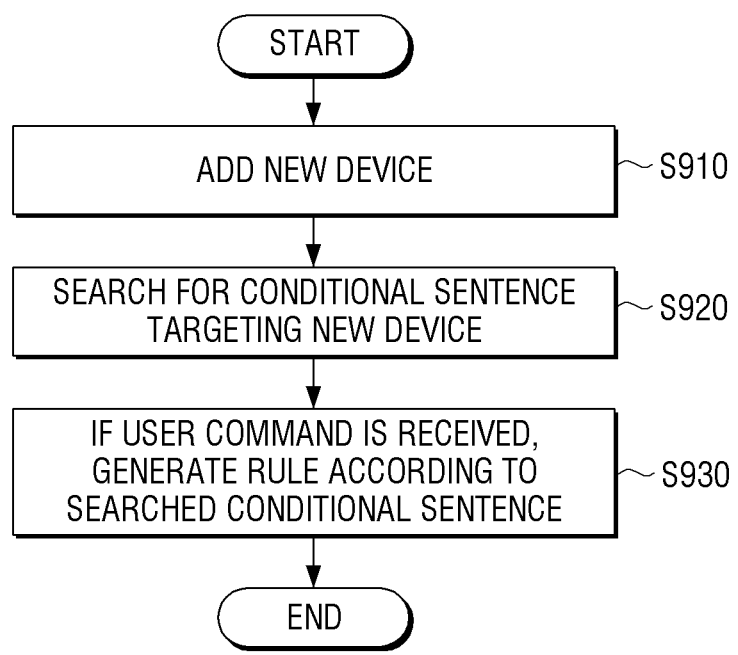
FIG. 9 is a flowchart of a method of generating a new rule according to an exemplary embodiment.

FIG. 9 is a flowchart of a method of generating a new rule according to an exemplary embodiment.

Referring to FIG. 9, an addition of a new device is sensed in operation S910. In detail, a home server may determine that the new device is connected to a home network.

In operation S920, a conditional sentence targeting the new device is searched. In detail, the home server searches a server (e.g., an internet server) that is accessible by anyone for the conditional sentence of the new device. In this case, the home server may refer to device status information and/or use pattern information to enable a search appropriate for a situation of a home network and a user.

A rule according to the searched conditional sentence is generated in operation S930. In detail, if a user command for permitting a registration of the rule according to the searched conditional sentence is received, the home server may generate the rule according to the searched conditional sentence. The user command may be input from an interface screen that recommends the searched conditional sentence displayed on a user terminal device.

The method of generating the rule by controlling the home server as described above may automatically generate a rule when installing a new device and recommend a rule appropriate for a home network environment and a lifestyle of a user.

Figure 10:
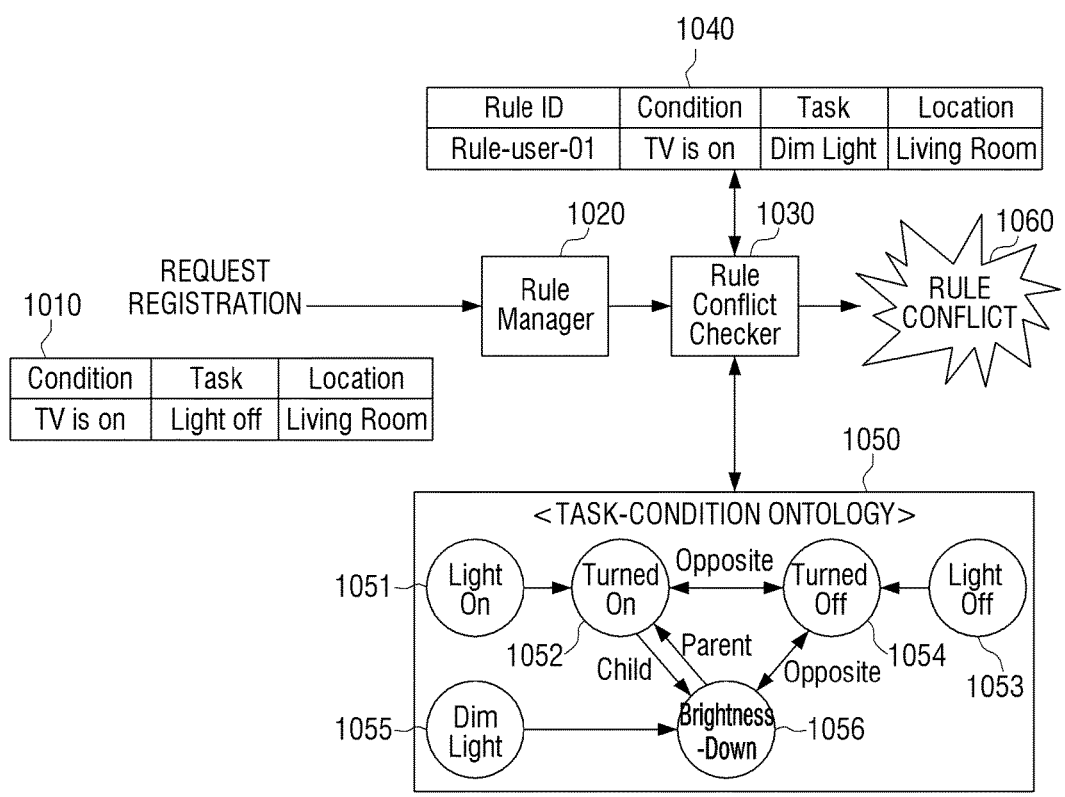
FIG. 10 illustrates a process of determining a rule conflict according to an exemplary embodiment.

FIG. 10 illustrates a process of determining a rule conflict according to an exemplary embodiment.

Referring to FIG. 10, information for requesting a registration of a new rule 1010 is transmitted to a rule manager 1020. The registration request may be a registration request for a rule that is automatically generated when a particular event occurs in a home server or a registration request for a rule that is arbitrarily written by a user.

The rule manager 1020 transmits the new rule 1010 to a rule conflict checker 1030.

The rule conflict checker 1030 determines a conflict between a rule 1040 preregistered in the user rule DB 740 and the new rule 1010 with reference to a task condition ontology 1050.

A conflict between rules refers to a relation between two rules that are incompatible with each other. The task condition ontology 1050 shows relations between statuses of actions or tasks that are performed. In the exemplary embodiment of FIG. 10, a light-on 1051 corresponds to a turned-on status 1052, a light-off 1053 corresponds to a turned-off status 1054, and dim-light 1055 corresponds to a brightness-down status 1056.

The turned-on status 1052 is in an opposite relation to the turned-off status 1054 and in a parent (or higher rank) relation to the brightness-down status 1056. The turned-off status 1054 is in an opposite relation to the brightness-down status 1056. The brightness-down status 1056 is in a child (or lower rank) relation to the turned-on status 1052.

Since the preregistered rule 1040 and the new rule 1010 correspond to the same conditions where the TV is turned on and the TV is located in a living room but respectively have tasks of the dim-light 1055 and the light-off 1053 of which post conditions correspond to statuses 1056 and 1054 that are in an opposite status to each other, the rule conflict checker 1030 determines that the preregistered rule 1040 and the new rule 1010 are incompatible with each other (i.e., determines a rule conflict 1060).

If the rule conflict 1060 is determined, the rule manager 1020 may transmit a notification message indicating that a rule may not be registered, to a user terminal device.

Figure 11:
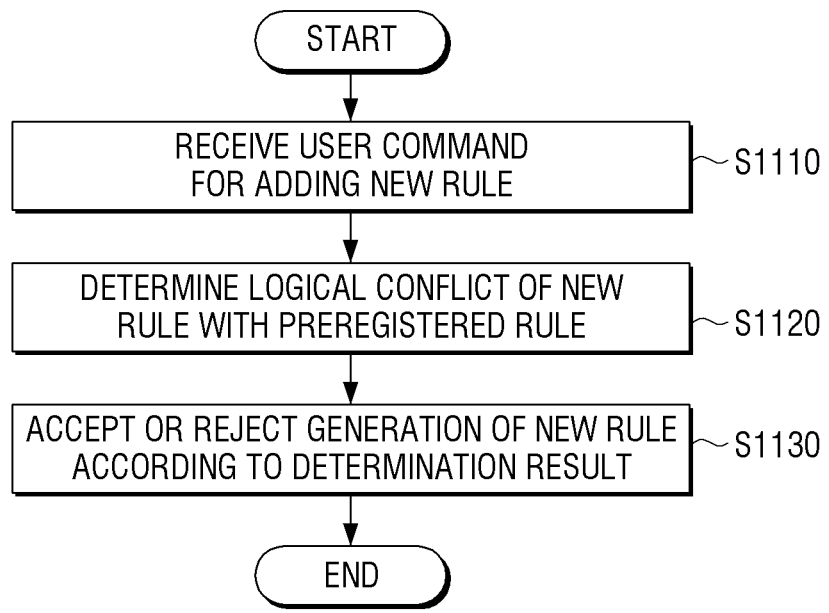
FIG. 11 is a flowchart of a method of determining a rule conflict according to an exemplary embodiment.

FIG. 11 is a flowchart of a method of determining a rule conflict according to an exemplary embodiment.

Referring to FIG. 11, a user command for adding a new device is received in operation S1110. The user command may be a command that is received from a user terminal device displaying a UI for generating the new rule.

In operation S1120, a logical conflict of the new rule is determined. In detail, a home server may determine a logical conflict or a compatibility of the new rule with a preregistered rule. The logical conflict of the new rule and the compatibility with the preregistered rule will be described in detail later with reference to FIGS. 12 through 15.

In operation S1130, the new rule is generated or the generation of the new rule is denied according to the determination result. In detail, if the new rule does not conflict with the preregistered rule, the home server may generate a rule and may register the rule in a home network. If the new rule conflicts with the preregistered rule, the home server may deny the generation of the new rule and may discard the new rule.

The method of determining the rule conflict by controlling the home server as described above may determine a validity of a newly registered rule.

Figure 12:
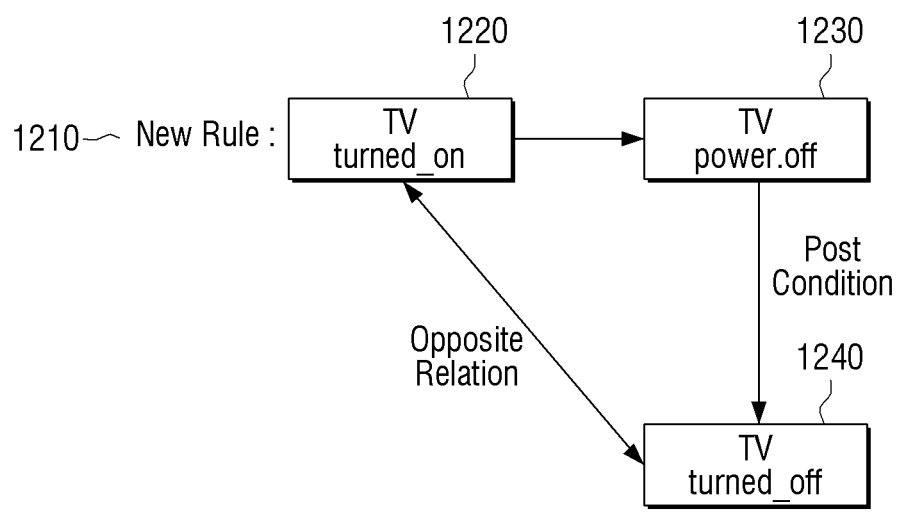
FIG. 12 illustrates a first example of a rule conflict according to an exemplary embodiment.

FIG. 12 illustrates a first example of a rule conflict according to an exemplary embodiment.

Referring to FIG. 12, a new rule 1210 has a status 1220, where a TV is turned on, as a condition and has an action 1230 of turning off power of the TV as a task. A post condition of the new rule 1210 after the action 1230 is performed is a status 1240 where the TV is turned off.

The status 1220 that is the condition of the new rule 1210 is in an opposite relation to the post condition 1240 after the action 1230 is performed. In detail, if the TV is turned on, the new rule 1210 turns off the TV, and thus a condition where the TV is turned on may not be achieved. In other words, the new rule 1210 has a logical conflict. The first example of a rule conflict as described above refers to a case in which a condition and an action of the rule may not be achieved together.

Figure 13:
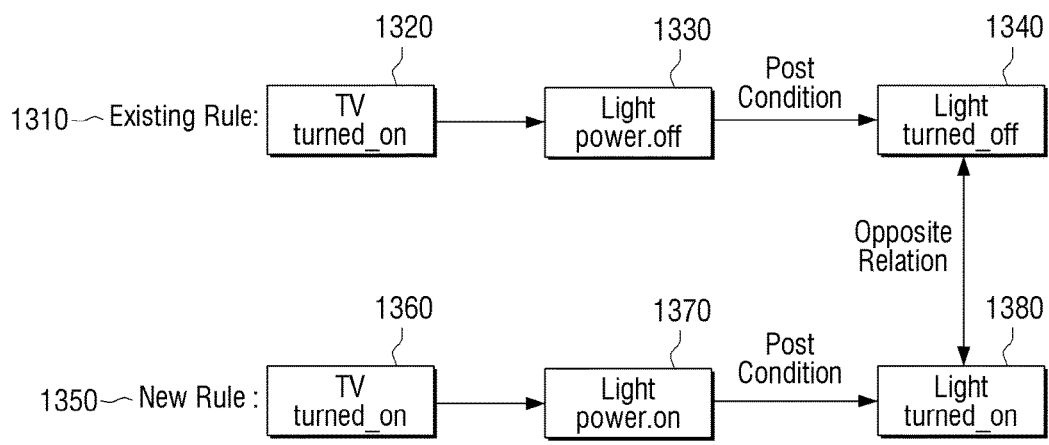
FIG. 13 illustrates a second example of a rule conflict according to an exemplary embodiment.

FIG. 13 illustrates a second example of a rule conflict according to an exemplary embodiment.

Referring to FIG. 13, a new rule 1350 has the same status as an existing rule 1310 as a condition. In detail, the new rule 1350 and the existing rule 1310 respectively have statuses 1360 and 1320, where a TV is turned on, as conditions.

The existing rule 1310 has an action 1330 of turning off power of a light as a task. The new rule 1350 has an action 1370 of turning on the power of the light as a task. A post condition of the existing rule 1310 is a status 1340 where the light is turned off. A post condition of the new rule 1350 is a status 1380 where the light is turned on. Since the two post conditions 1340 and 1380 are in an opposite relation to each other, the existing rule 1310 and the new rule 1350 are incompatible with each other. In other words, when the TV is turned on, a status where the light is turned on and a status where the light is turned off may not coexist. The second example of the rule conflict as described above refers to a case where a post condition of a new rule may not coexist with a post condition of an existing rule.

Figure 14:
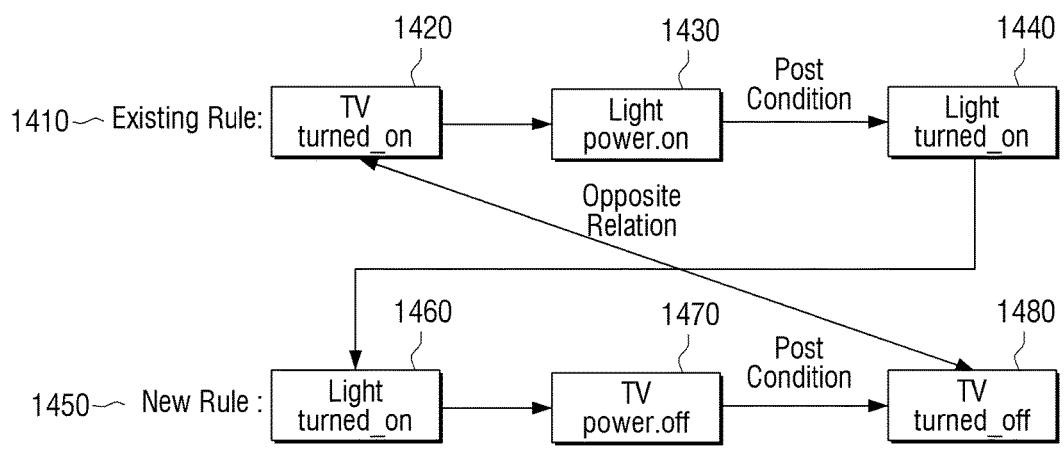
FIG. 14 illustrates a third example of a rule conflict according to an exemplary embodiment.

FIG. 14 illustrates a third example of a rule conflict according to an exemplary embodiment.

Referring to FIG. 14, a post condition of an existing rule 1410 is a status 1440 where a light is turned on. A status that is a condition of a new rule 1450 is equal to the post condition 1440 of the existing rule 1410.

The new rule 1450 has an action 1470 of turning off power of a TV as a task. A post condition that is achieved after the action 1470 is performed is a status 1480 where the TV is turned off. The post condition 1480 of the new rule 1450 is in an opposite relation to a status 1420 that is a condition of the existing rule 1420 and has a logical conflict. In detail, if the TV is turned on, a home server turns on the light according to the existing rule 1420 and turns off the TV according to the new rule 1450. In other words, a status where the TV is turned on may not exist according to actions of the existing rule 1410 and the new rule 1450. The third example of the rule conflict as described above refers to a case where a post condition that is achieved after actions of the existing rule 1410 and the new rule 1450 are performed renders the status 1420, which is a condition of the existing rule, impossible. One existing rule 1410 is exemplarily illustrated in FIG. 14, but the third example of the rule conflict may also include a case where two or more existing rules may be connected to each other, and a post condition of a new rule having a last post condition as a condition renders a status, which is a condition of an initial existing rule, impossible.

Figure 15:
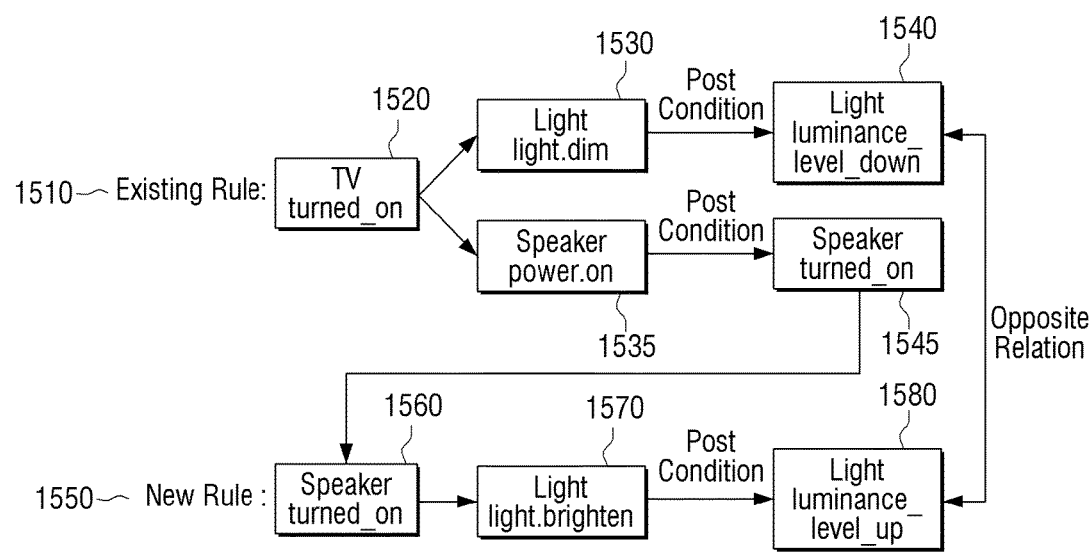
FIG. 15 illustrates a fourth example of a rule conflict according to an exemplary embodiment.

FIG. 15 illustrates a fourth case of a rule conflict according to an exemplary embodiment.

Referring to FIG. 15, if an existing rule 1510 is in a status 1520 where a TV is turned on, the existing rule 1510 performs an action 1530 of dimming a light and an action 1535 of turning on power of a speaker. Post conditions that are achieved after performing the two actions 1530 and 1535 are respectively a status 1540 where a luminance level of the light is down and a status 1545 where the speaker is turned on.

The new rule 1550 has a status 1560 where the speaker is turned on, as a condition. A status that is a condition of the new rule 1550 is equal to the status 1545 of one of the post conditions of the existing rule 1510. The new rule 1550 has an action 1570 of brightening the light as a task. A post condition that is achieved after performing the action 1570 is a status 1580 where a luminance level of the light is up.

The post condition 1580 of the new rule 1550 is in an opposite relation to the status 1540 of one of the post conditions of the existing rule 1510. As a result, the new rule 1550 is in an incompatible relation with the existing rule 1510. In detail, if the TV is turned on according to the existing rule 1510, the home server turns on the speaker. If the speaker is turned on according to the new rule 1550, the home server may increase a luminance of the light. However, simultaneously with this, the home server may lower the luminance of the light according to another action of the existing rule 1510, and thus a rule conflict occurs between the existing rule 1510 and the new rule 1550. The fourth case of the rule conflict as described above refers to a case where a post condition of a new rule that is connected to one of a plurality of post conditions of an existing rule is incompatible with another post condition of the existing rule. One existing rule 1510 is exemplarily illustrated in FIG. 15, but the fourth case of the rule conflict may further include a case where two or more existing rules are connected to one another, and a post condition of a new rule having a last post condition as a condition is incompatible with another post condition of an initial existing rule.

Four cases of rule conflicts have been described above with reference to FIGS. 12 through 14. It is common to the four cases that if statuses that are conditions in opposite relations to each other are connected to a post condition or two post conditions are in opposite relations to each other, a closed loop is formed. In detail, as shown in FIGS. 12 through 14, a status that is a condition, an action, and/or a post condition may be connected to one another as one node to be subsequently represented on a graph. Also, a rule conflict includes a condition that is in opposite relation to a post condition of a new rule. The closed loop indicates that a forward or reverse tracking is performed from conditions having an opposite relation along the graph to return to a post condition of a new rule. An algorithm for drawing the closed loop may be a method of checking whether a rule conflict occurs.

Figure 16:
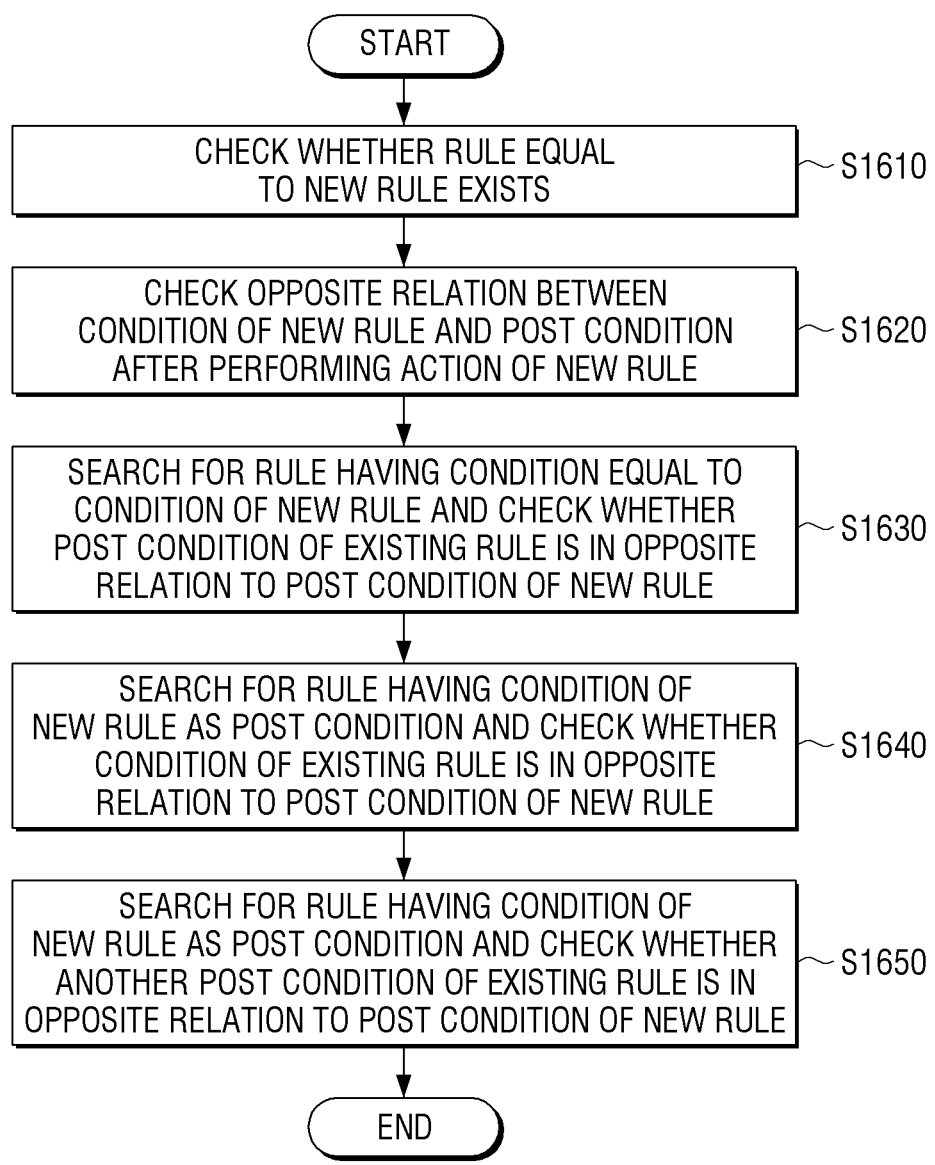
FIG. 16 is a flowchart of a method of checking first through fourth cases of a rule conflict according to an exemplary embodiment.

FIG. 16 is a flowchart of a method of checking first through fourth cases of a rule conflict according to an exemplary embodiment.

Referring to FIG. 16, a home server checks whether the same rule as a new rule exists, in operation S1610. In other words, the home server checks whether a rule to be added is an existing rule. If it is checked that a new rule exists, the home server rejects a registration of the new rule and ends a process of checking a rule conflict.

If the new rule is a rule that is not an existing registered rule, the home server checks an opposite relation between a status that is a condition of the new rule and a post condition of the new rule that is achieved after performing an action of the new rule in operation S1620. In other words, the home server checks whether the opposite relation corresponds to the first example of the rule conflict as described in FIG. 12. If the opposite relation is checked, the home server returns a conflict and ends the process.

If the condition of the new rule and the post condition is not in the opposite relation, the home server searches for a rule having the same condition as the condition of the new rule and checks whether a post condition of the existing rule is in an opposite relation to a post condition of the new rule in operation S1630. In other words, the home server checks whether the opposite relation corresponds to the second example of the rule conflict as described in FIG. 13. If a rule having the same condition as the status that is the condition of the new rule exists, and a post condition of the rule is in an opposite relation to the post condition of the new rule, the home server returns the conflict and ends the process.

If there is no rule having the same status as the condition of the new rule as a condition or there is no rule having a condition of an opposite relation to the post condition of the new rule as a post condition, the home server searches for a rule having the status that is the condition of the new rule as a post condition and checks whether a status that is a condition of an existing rule is in an opposite relation to the post condition of the new rule in operation S1640. In other words, the home server checks whether the opposite relation corresponds to the third example of the rule conflict as described in FIG. 14. If a rule having a status in an opposite relation to the post condition of the new rule as a condition is searched, and a post condition of the rule is the condition of the new rule, the home server returns the conflict and ends the process.

If there is no rule having the status that is the condition of the new rule as a post condition or there is no rule having a status in an opposite relation to the post condition of the new rule as a condition, the home server searches for a rule having the condition of the new rule as a post condition and checks whether another post condition of the existing rule is in an opposite relation to the post condition of the new rule in operation S1650. In other words, the home server checks whether the opposite relation corresponds to the fourth case of the rule conflict as described in FIG. 15. If a rule having a condition in an opposite relation to the post condition of the new rule as a post condition is searched, and another post condition of the rule is the same as the condition of the new rule, the home server returns the conflict and ends the process.

If the conflict is not returned according to a result of the above process, the home server may check that a rule conflict does not occur and perform a process of registering a new rule.

According to various exemplary embodiments, a home server may automatically generate a rule appropriate for a home network system. Also, if a new IoT device is added, the home server may provide a new rule using the new IoT device. In addition, the home server may prevent an inappropriate rule (e.g., a rule conflicting with pre-registered rules) from being registered.

A method of controlling a home server according to various exemplary embodiments as described above may be realized in a home server shown in FIG. 1 or 2. Also, the method of controlling the home server according to various exemplary embodiments described above may be implemented in a program to be provided to the home server. Particularly, the program including the method of controlling the home server may be stored and provided in a non-transitory computer readable medium.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, a read-only memory (ROM), or the like.

At least one of the components, elements or units represented by a block as illustrated in FIGS. 1-3 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. An electronic apparatus in a home network system, the electronic apparatus comprising:
   a communication interface configured to communicate with a plurality of devices, included in the home network system, and a server of an internet network; and
   a controller configured to extract a conditional sentence from a webpage of the server, the conditional sentence comprising a condition and an action, and configured to generate a rule for controlling at least one of the plurality of devices to perform the action of the conditional sentence in response to the condition of the conditional sentence being satisfied.

2. The electronic apparatus of claim 1, wherein the conditional sentence is written in a natural language.

3. The electronic apparatus of claim 1, wherein the controller is further configured to analyze a source code of the webpage to extract the conditional sentence from the webpage.

4. The electronic apparatus of claim 1, wherein the controller is further configured to perform natural language processing (NLP) with respect to the extracted conditional sentence to generate computer recognizable information corresponding to the condition and the action of the conditional sentence and configured to generate the rule based on the generated computer recognizable information.

5. The electronic apparatus of claim 1, wherein the controller is further configured to determine at least one of a device that is a target to satisfy the condition and a device that is a target to perform the action, among the plurality of devices.

6. The electronic apparatus of claim 1, wherein, in response to a new device being added to the home network system, the controller is further configured to search, by using the server, for a second conditional sentence related to the new device and, in response to a user command, configured to generate a second rule based on the searched second conditional sentence.

7. The electronic apparatus of claim 6, wherein the controller is further configured to generate a recommendation list, the recommendation list comprising a plurality of second conditional sentences related to the new device, based on use pattern information and configured to generate the second rule based on the second conditional sentence that is selected from the recommendation list.

8. The electronic apparatus of claim 7, wherein the controller is further configured to generate the use pattern information based on at least one from among a rule preregistered in the electronic apparatus, a pattern of a user in using the plurality of devices, an evaluation of the searched second conditional sentence by another user, and information about whether another device related to the searched second conditional sentence exists in the home network system.

9. The electronic apparatus of claim 1, wherein the controller is further configured to skip generating the rule in response to a conflict between the rule and a preregistered rule.

10. The electronic apparatus of claim 9, wherein the preregistered rule comprises a second condition and a second action that is to be performed in response to the second condition being satisfied, and the conflict between the rule and the preregistered rule comprises at least one of:
    a conflict between the condition of the conditional sentence and a third condition that is achieved after performing the action of the conditional sentence;
    a conflict between the third condition and a fourth condition that is achieved after performing the second action of the preregistered rule;
    in a case where the fourth condition is equal to the condition of the conditional sentence, a conflict between the fourth condition and the second condition of the preregistered rule; and
    in a case where the preregistered rule comprises two or more second actions to be performed in response to the second condition being satisfied, and a fifth condition that is achieved after performing one of the two or more second actions of the preregistered rule is equal to the condition of the conditional sentence, a conflict between the third condition and a sixth condition that is achieved after performing another one of the two or more second actions of the preregistered rule.

11. A method of controlling an electronic apparatus in a home network system, the home network system comprising a plurality of devices, the method comprising:
    extracting, by the electronic apparatus, a conditional sentence from a webpage of a server through an internet network, the conditional sentence comprising a condition and an action; and
    generating, by the electronic apparatus, a rule for controlling at least one of the plurality of devices to perform the action of the conditional sentence in response to the condition of the conditional sentence being satisfied.

12. The method of claim 11, wherein the conditional sentence is written in a natural language.

13. The method of claim 11, wherein a source code of the webpage is analyzed to extract the conditional sentence from the webpage.

14. The method of claim 11, wherein the generating comprises:
    performing NLP with respect to the extracted conditional sentence to generate computer recognizable information corresponding to the condition and the action of the conditional sentence; and
    generating the rule based on the generated computer recognizable information.

15. The method of claim 11, further comprising:
    determining at least one of a device that is a target to satisfy the condition and a device that is a target to perform the action, among the plurality of devices.

16. The method of claim 11, wherein the generating comprises:
    in response to a new device being added to the home network system, searching, by using the server, for a second conditional sentence related to the new device; and
    in response to a user command, generating a second rule based on the searched second conditional sentence.

17. The method of claim 16, wherein the generating the second rule comprises:
    generating a recommendation list, the recommendation list comprising a plurality of second conditional sentences related to the new device, based on use pattern information; and
    generating the second rule based on the second conditional sentence that is selected from the recommendation list.

18. The method of claim 17, wherein the use pattern information is generated based on at least one from among a rule preregistered in the electronic apparatus, a pattern of a user in using the plurality of devices, an evaluation of the searched second conditional sentence by another user, and information about whether another device related to the searched second conditional sentence exists in the home network system.

19. The method of claim 11, wherein the generating the rule is skipped in response to a conflict between the rule and a preregistered rule.

20. The method of claim 19, wherein the preregistered rule comprises a second condition and a second action that is to be performed in response to the second condition being satisfied, and the conflict between the rule and the preregistered rule comprises at least one of:
    a conflict between the condition of the conditional sentence and a third condition that is achieved after performing the action of the conditional sentence;

a conflict between the third condition and a fourth condition that is achieved after performing the second action of the preregistered rule;

in a case where the fourth condition is equal to the condition of the conditional sentence, a conflict between the fourth condition and the second condition of the preregistered rule; and in a case where the preregistered rule comprises two or more second actions to be performed in response to the second condition being satisfied, and a fifth condition that is achieved after performing one of the two or more second actions of the preregistered rule is equal to the condition of the conditional sentence, a conflict between the third condition and a sixth condition that is achieved after performing another one of the two or more second actions of the preregistered rule.

\* \* \* \* \*